(12) United States Patent
Sakaki et al.

(10) Patent No.: US 7,620,794 B2
(45) Date of Patent: Nov. 17, 2009

(54) STORAGE SYSTEM WITH STORAGE APPARATUSES INCLUDING VIRTUAL SWITCHES

(75) Inventors: Hidetoshi Sakaki, Odawara (JP);
Hisaharu Takeuchi, Odawara (JP);
Masami Maeda, Odawara (JP); Masaru Tsukada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 341 days.

(21) Appl. No.: 11/594,823

(22) Filed: Nov. 9, 2006

(65) Prior Publication Data
US 2008/0059697 A1 Mar. 6, 2008

(30) Foreign Application Priority Data
Sep. 6, 2006 (JP) ............................. 2006-242055

(51) Int. Cl.
*G06F 3/06* (2006.01)
(52) U.S. Cl. .................... 711/221; 711/161; 709/245
(58) Field of Classification Search ................ 711/161, 711/221; 709/245
See application file for complete search history.

(56) References Cited

U.S. PATENT DOCUMENTS 7,397,794 B1 * 7/2008 Lacroute et al. ............. 370/367
2003/0131182 A1 * 7/2003 Kumar et al. ................ 711/5
2004/0054866 A1 * 3/2004 Blumenau et al. ........... 711/202
2004/0260861 A1 * 12/2004 Serizawa et al. ............. 711/4
2006/0059308 A1 3/2006 Uratani et al.
2007/0094466 A1 * 4/2007 Sharma et al. ............. 711/162

FOREIGN PATENT DOCUMENTS

JP 2006-085398 9/2004

OTHER PUBLICATIONS

Chinese Office Action mailed Apr. 2, 2009 in English.

* cited by examiner

*Primary Examiner*—Christian P Chace
*Assistant Examiner*—Jared I Rutz
(74) *Attorney, Agent, or Firm*—Stites & Harbison PLLC; Juan Carlos A. Marquez, Esq.

(57) ABSTRACT

An object of the present invention is to integrally manage disk storage apparatuses through virtualization. Some physical storage apparatuses 14 connected to a host computer 10 via a communication network 12 are virtualized with a virtual switch 18, a control unit 20, and a virtual device 22. The physical storage apparatus specifies a command when receiving the command from the host computer 10, and accesses, if the command access has been made to its own physical storage apparatus, a real disk via the virtual control unit 20 and virtual device 22, and executes I/O processing. If the command access is not made to its own physical storage apparatus, the physical storage apparatus 14 directs the command to the transmission target via the virtual switch 18. The physical storage apparatuses 14 are integrally managed according to the command in the above described manner.

8 Claims, 14 Drawing Sheets

FIG.3A  T1

| HOST-ORIENTED PHYSICAL PATH # | HOST# (NODE INFORMATION) | PHYSICAL PORT # | HOST SW#/Port# | VIRTUAL SW#/Port# |
|---|---|---|---|---|
| 1 | 0 | A | 8010 | 6012 |
| 2 | 1 | A | 8012 | 6012 |
| : | : | : | : | : |

FIG.3B  T2

| HOST-ORIENTED PHYSICAL PATH # | CHL Image# | VIRTUAL CU # |
|---|---|---|
| 1 | 00 | n0 |
| 1 | 00 | n1 |
| : | : | : |
| 1 | 00 | nk |
| 2 | 00 | 10 |
| : | : | : |

FIG.3C  T3

| INTER-STORAGE PHYSICAL PATH # | PHYSICAL PORT # | VIRTUAL SW#/Port# | ADJOINING SW#/Port# | TARGET STORAGE PHYSICAL APPARATUS # | CONNECTION DESTINATION SW#/Port# |
|---|---|---|---|---|---|
| 1 | C | 6012 | 9011 | N | 9012 |
| 2 | C | 6012 | 9011 | 1 | 9013 |
| 3 | NULL | 6011 | NULL | 0 | NULL |
| : | : | : | : | : | : |

FIG.3D  T4

| INTER-STORAGE PHYSICAL PATH # | PHYSICAL PORT # | VIRTUAL SW#/Port# | TARGET STORAGE PHYSICAL APPARATUS # | CONNECTION DESTINATION SW#/Port# |
|---|---|---|---|---|
| 1 | B | 6n12 | 0 | 9010 |
| 2 | B | 6n12 | 1 | 9013 |
| 3 | NULL | 6n11 | N | NULL |
| : | : | : | : | : |

FIG.3E  T5

| INTER-STORAGE PHYSICAL PATH # | PHYSICAL PORT # | VIRTUAL CU # |
|---|---|---|
| 1 | C | n0 |
| 1 | C | n1 |
| : | : | : |
| 1 | C | nk |
| 2 | C | 10 |
| : | : | : |

FIG.3F  T6

| INTER-STORAGE PHYSICAL PATH # | PHYSICAL PORT # | VIRTUAL CU # |
|---|---|---|
| 1 | B | 00 |
| 1 | B | 01 |
| : | : | : |
| 1 | B | 0k |
| 2 | B | 10 |
| : | : | : |

FIG.3G  T7

| VIRTUAL CU# | VIRTUAL DEV# | PHYSICAL STORAGE APPARATUS # | PHYSICAL CU # | PHYSICAL DEV# |
|---|---|---|---|---|
| 00 | 0 | 0 | 0 | 0 |
| 00 | 1 | 0 | 0 | 1 |
| : | : | : | : | : |
| 00 | FF | 0 | 0 | FF |
| 01 | 0 | 0 | 1 | 0 |
| 01 | 1 | 0 | 1 | 1 |
| : | : | : | : | : |
| 01 | FF | 0 | 1 | FF |
| : | : | : | : | : |
| 0k | 0 | 0 | k | 0 |
| 0k | 1 | 0 | k | 1 |
| : | : | : | : | : |
| 0k | FF | 0 | k | FF |

FIG.3H  T8

| VIRTUAL CU# | VIRTUAL DEV# | PHYSICAL STORAGE APPARATUS # | PHYSICAL CU # | PHYSICAL DEV# |
|---|---|---|---|---|
| n0 | 0 | N | 0 | 0 |
| n0 | 1 | N | 0 | 1 |
| : | : | : | : | : |
| n0 | FF | N | 0 | FF |
| n1 | 0 | N | 1 | 0 |
| n1 | 1 | N | 1 | 1 |
| : | : | : | : | : |
| n1 | FF | N | 1 | FF |
| : | : | : | : | : |
| nk | 0 | N | k | 0 |
| nk | 1 | N | k | 1 |
| : | : | : | : | : |
| nk | FF | N | k | FF |

STORAGE SYSTEM WITH STORAGE APPARATUSES INCLUDING VIRTUAL SWITCHES

CROSS-REFERENCE TO RELATED APPLICATIONS

This application relates to and claims priority from Japanese Patent Application No. 2006-242055, filed on Sep. 6, 2006, the entire disclosure of which is incorporated herein by reference.

BACKGROUND

1. Field of the Invention

The invention relates to a storage system and a control method for the storage system, more particularly to a storage system in which storage subsystems are connected to each other can direct access received from a host computer to another storage subsystem, and a control method for that storage system.

2. Description of Related Art

A type of storage system in which a host computer and storage subsystems are mutually connected via a communication network and information is exchanged between the host computer and each storage subsystem is well known. JP-A-2006-85398 discloses, as a storage subsystem used in that type of storage system, a disk storage apparatus provided with a logical device, which is a data storage target device, a connection control unit, and a virtual logical unit has been proposed. That disk storage apparatus can switch connection between the virtual logical unit and the logical device in such a way that no change is observed by the control unit included in the host computer, when the disk storage apparatus is seen from the host computer.

Larger data storage capacity in storage subsystems is being required at present. Meanwhile, in the storage subsystem disclosed in JP-A-2006-85398, the target of virtualization is one internal disk storage device and one external disk storage device, but the technique disclosed there is not sufficient for integral management of a larger number of disk storage devices.

An object of the present invention is to integrally manage all storage subsystems belonging to one storage system by virtualizing those storage subsystems. Another object is to provide a storage system in which the host computer configuration definition does not have to be changed and only a change in storage subsystem configuration information is necessary.

SUMMARY

To achieve the above stated objects, the present invention can virtualize the target of an access from a host computer to grouped storage subsystems by providing a virtual switch that enables a switching operation for directing an access from a host computer to a storage subsystem belonging to a storage system to another storage subsystem. As a result, all accesses from the host computer to any of the grouped storage subsystems can be integrally managed.

The present invention provides a storage system including a host computer and storage subsystems that provide a storage area to the host computer. In that storage system, each storage subsystem includes an access area that receives an access from at least either of the host computer or another storage subsystem; a storage area for data exchanged with the host computer; a first control circuit for controlling data I/O to/from the storage area according to a command transmitted from the host computer to the access area; and a second control circuit for determining whether the access has been made to an access target in its own storage subsystem or-one in another storage subsystem, and receiving the access if the access target is its own storage subsystem, and translating, if the access target is another storage subsystem, the access target address into an address in the relevant storage subsystem, and directing the address-translated access to the access area in the relevant storage subsystem.

According to the present invention, storage subsystems can be integrally managed through virtualization. Moreover, even if the storage subsystem configuration is changed, the configuration definition in a host computer does not have to be changed.

BRIEF DESCRIPTION OF THE DRAWINGS

FIGS. 3A-3H are diagrams showing tables.

DETAILED DESCRIPTION OF PREFERRED EMBODIMENTS

Figure 1:
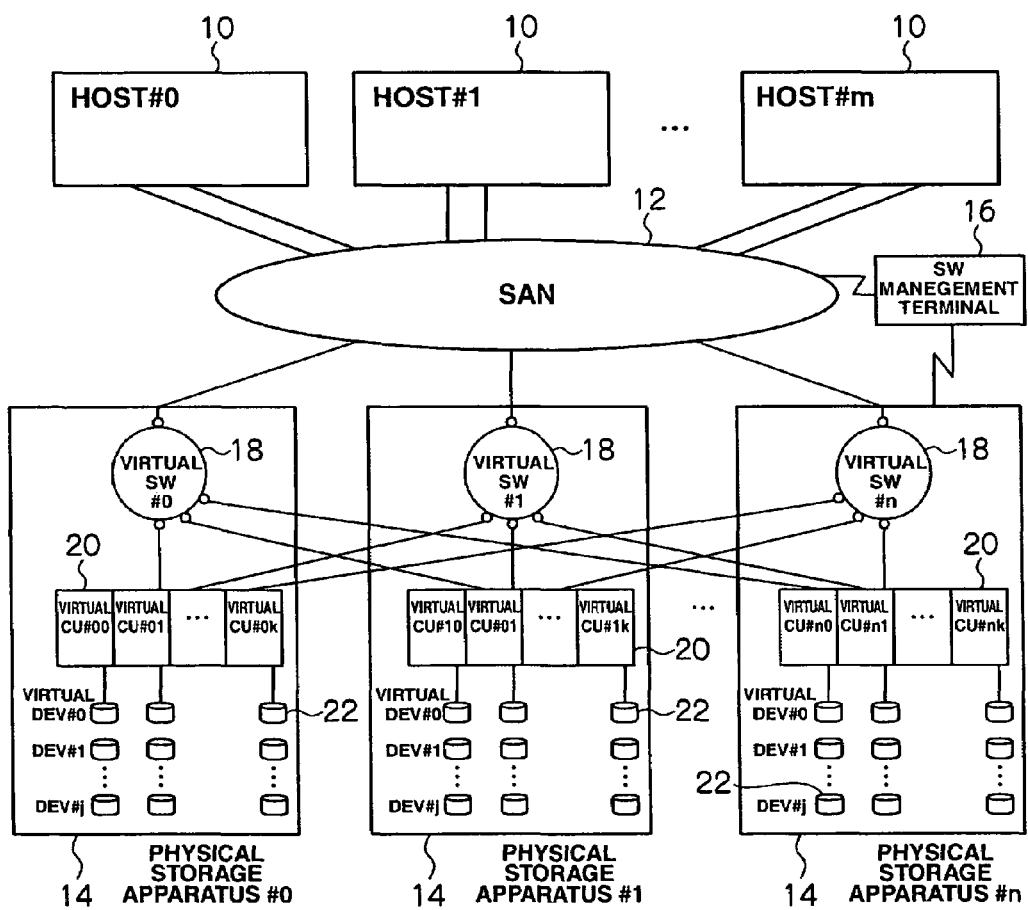
FIG. 1 is a block diagram illustrating a basic configuration of a storage system according to the present invention.

Embodiments of the present invention will be described below with reference to the drawings. FIG. 1 is a block diagram showing a basic configuration of the storage system according to the present invention. In FIG. 1, the storage system includes host computers #0-#m (10) as mainframe host systems. The respective host computers are connected, via a communication network 12, to disk storage apparatuses #0-#n (14), which are storage subsystems. The communication network is connected to an switch (SW) management terminal 16 that manages control information about virtual switches described later.

The communication network 12 may be a SAN (Storage Area Network), the Internet, or a dedicated line or similar. If a SAN is used, data is exchanged between each host computer (10) and each disk storage apparatus (14) according to Fibre Channel protocol (FCP), or FICON protocol (FC-SB2, FC-SB3: Fibre Channel Single Byte) for mainframes.

In some disk storage apparatuses 14, physical storage elements, which are real storage devices (disks), are virtualized as logical elements to the host computers and another disk storage apparatus. For example, in a disk storage apparatus #0 (14), the physical storage elements are virtualized by using a virtual switch #0 (18), virtual control units (CU(s)) #00-#0$k$ (20), and virtual DEVs (devices) #0-#j (22). That virtualization occurs also in disk storage apparatuses (physical storage apparatus) #1 (and subsequent numbers). The virtual switch in each storage apparatus is connected to that in another storage apparatus.

The "virtual switch" means a channel control unit recognizing a target of an access from a host computer based on information in a control table, and translating and outputting the access target address if necessary.

Accordingly, the "virtual switch" is not a physical element. The virtual CUs and virtual DEVs are logical storage units of the virtualized physical storage areas in the physical storage apparatuses. Virtual devices are on a lower level of the virtual CU.

Each of the virtual switches #0-#n (18) has a path connected to a physical switch in the communication network 12, a path to the virtual CU 20 in its own disk storage apparatus, and a path to the virtual switch in another disk storage apparatus. A command access from the host computer can be made to a specific virtual CU and a specific virtual DEV 22 belonging to that virtual CU in any one of physical storage apparatuses #0-#n via the virtual switch in the relevant physical storage apparatus.

A command access from the host computer can also be made, via the virtual switch in any one of physical storage apparatuses #0-#n, to a specific virtual CU and a specific virtual DEV 22 belonging to that virtual CU in another physical storage apparatus. The virtual switch in each physical storage apparatus includes a logical path connected to the virtual CUs in the physical storage apparatus the relevant virtual switch belongs to, and a path connected to the virtual switch in another physical storage apparatus. The virtual switch analyzes a command from the host and selects a specific path from among several paths. Each virtual device 22 in the physical storage apparatuses #0-#n corresponds to a real storage device group. A group of virtual devices is allocated to each group of virtual CUs 20 (CU#n0 . . . CU#n$k$).

System generation in the host computer is performed based on the physical switch in the SAN 12 and the virtual switch #/virtual CU #/virtual DEV # ("#" means an identification number for specifying each element) in the physical storage apparatuses. In the storage system shown in FIG. 1, the virtual switch can direct an access from the host computer to a virtual switch in another physical storage apparatus, and so redundant routes are provided for an access from the host computer to a specific physical storage apparatus. In other words, an access from the host computer to the physical storage apparatus can be made via alternate paths. In the storage system shown in FIG. 1, the access from the host computer can be received by both #0 and #n physical storage apparatuses if those physical storage apparatuses are connected to the SAN 12, even when the physical storage apparatuses between #0 and #n are not connected to the SAN.

Figure 2:
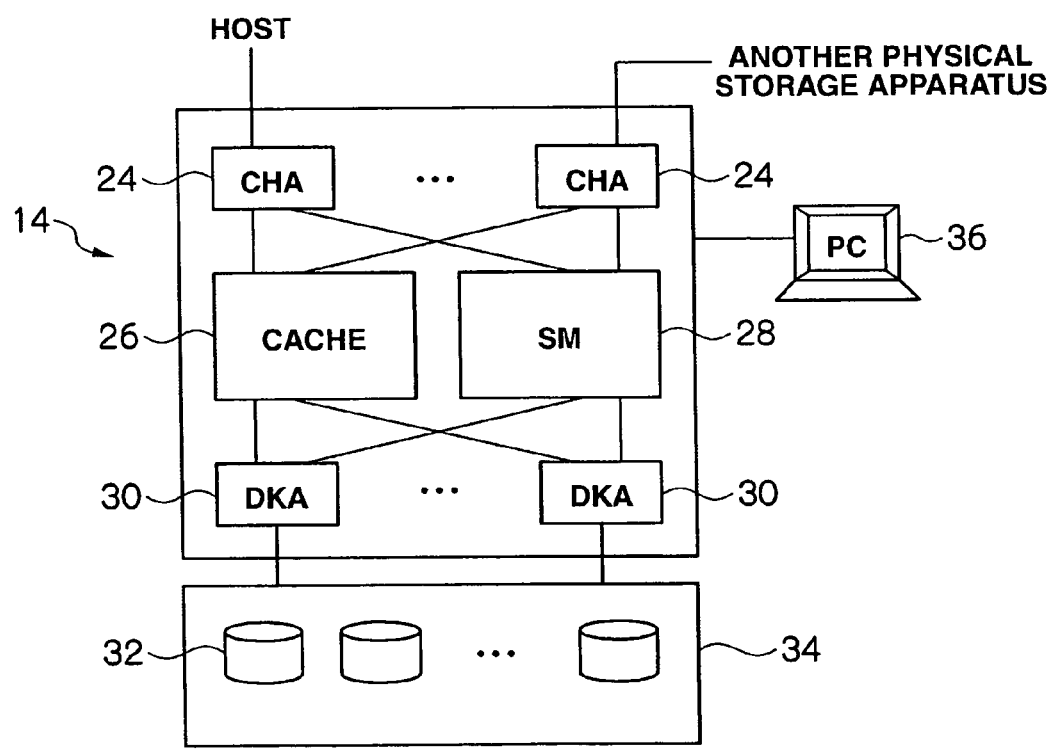
FIG. 2 is a block diagram illustrating a physical element configuration of a disk storage apparatus.

As shown in FIG. 2, each physical storage apparatus 14 includes, as physical elements, channel adapters 24, cache memory (CACHE) 26, shared memory (SM) 28, disk adapters (DKA) 30, and a storage unit 34 having physical disks 32. The channel adapter section 24 is connected to the host computer 10, another physical storage apparatus 14, cache memory 26, and shared memory 28 via the communication network 12. Each channel adapter has a microprocessor and memory including a microprogram. The microprocessor realizes the operations of the above described virtual switches 18, virtual CUs 20, and virtual DEVs 14 according to the microprogram.

The cache memory 26 temporarily holds read/write data. The shared memory 28 holds control information used for realizing and managing the virtual switches 18, virtual CUs 20, and virtual DEVs 14. Control information settings for the shared memory 28 are established by the management terminal 36. The disk adapter 30 controls processing concerning data read/write from/to the disks 32 by accessing the physical disks 32, which are the real storage devices.

Unique identification information is given to each virtual switch so that, in the storage system, which includes several physical storage apparatuses, a virtual switch in one of the physical storage apparatuses can be specially distinguished from a virtual switch in another physical storage apparatus. The identification information is stored as part of physical storage information in the shared memory in each physical storage apparatus. A target of a command or data transmitted from the host computer is specified based on the virtual switch identification information.

Each channel adapter 24 analyzes a command sent from the host, and, if the access target of the command is its own storage subsystem, executes processing for writing/reading data to/from the access target disk adapter 30 and storage device 32 based on the identification information added to the command about the virtual CU 20 and virtual DEV 22. The disk adapter 30 translates logical access specifying the virtual CU and virtual DEV into access to a physical storage area in the physical device 32. The SW management terminal 16 manages and establishes various settings for the virtual switch 18 in each physical storage apparatus.

The channel adapter in one of the physical storage apparatuses is connected to the channel adapter(s) in one or more other physical storage apparatus(es). This connection may be made via the communication network, or made directly between the channel adapters. As is understood from FIG. 1, when the host computer accesses one of the physical storage apparatuses, the access can be made directly via the SAN 12, or via the virtual switch in another physical storage. The host computer has system generation information used for identifying every virtual switch, virtual CU, and virtual device provided by the physical storage apparatuses included in the storage system shown in FIG. 1. The host computer identifies a specific physical storage logical area and issues a command based on the system generation information.

FIG. 3 show control tables stored in the shared memory in each physical storage apparatus. The channel adapter accesses a specific logical storage area based on those control tables. The control information illustrated in FIG. 3 is based on the connection between the host computer and the physical storage apparatuses #0, #1, and #n. The table T1 defines a physical path between the disk storage apparatus #0 (14) and the host computer. Information in the table T1 is determined when a power switch in the physical storage apparatus #0 is turned on, physical path online processing is performed, or cable connection/disconnection is established.

The host-directed physical path # 1, 2, . . . , the host node information 0, 1, . . . , the physical port #A, . . . , the host switch #/port # 8010, . . . , and the virtual switch #/port # 6012, . . . are set in T1. T1 information is included in FLOG I/PLOG I exchanged between the host computer and the physical storage apparatuses 14 when linkup is established.

The table T2 is a control table for logical paths between the physical storage apparatus #0 and the host computer. The physical storage apparatus #0 sets, when receiving an ELP (Establish Logical Path) from the host computer (14), the host-directed physical path # 1, 2, . . . , the CHL (channel) IMAGE # 00, . . . , and the virtual CU # n0, n1, . . . , nk, . . . in the table T2. The ELP issued by the host computer 10 includes the information for the table T2.

The table T3 is a control table defining physical paths between the physical storage apparatus #0 and another physical storage apparatus.

Settings for this table are established by the channel adapters in the physical storage apparatus #0 based on information from a service processor 36 connected to the physical storage apparatus, the SW management terminal 16, or management software in the host system. The inter-storage physical path # 1, 2, . . . , the physical port # C, C, NULL, . . . , the virtual switch #/port # 6012, 6012, 6011, . . . , the virtual switch-connected, that is, the virtual switch-adjoining physical switch #/port # 9011, 9011, NULL, . . . , the physical storage apparatus #0 connection target physical storage apparatus # N, 1, . . . , and the target physical storage apparatus's connection destination switch # port # 9012, 9013, NULL, . . . are set in the table T3.

The procedure for setting information for the table T3 will be described with reference to an example of settings based on information from the SW management terminal 16. Using a setting screen provided in the terminal, a storage system administrator inputs virtual switch identification information, then inputs the virtual switch port number and physical port number, and then inputs the identification information (switch number and port number) about the virtual switch or physical switch. After that, the administrator executes processing for linkup between the physical storage apparatus #0 and another storage apparatus. The information is set when the linkup ends.

The table T4 is a control table concerning physical paths between the physical storage apparatus #n and another physical storage apparatus. As in the table T3, the inter-storage physical path # 1, 2, 3, . . . , the physical port # B, B, NULL, . . . , the virtual switch #/port # 6n12, 6n12, 6n11, . . . , the target physical storage apparatus # 0, 1, N, . . . , and the connection destination switch #/port # 9010, 9013, NULL, . . . are set in the table T4. In the tables T3 and T4, "NULL" is registered for the physical port # and the connection destination #/port # in the relevant storage apparatus.

The table T5 is an inter-physical storage logical path table showing the correspondence between the physical ports in the physical storage apparatus #0 and the virtual CU # in another physical storage apparatus. "C" represents the physical port in the physical storage apparatus #0, "n0" represents the virtual CU in the physical storage apparatus #n, and the table indicates that a logical path is formed between them. The table T6 shows the correspondence between the physical port in the physical storage apparatus #n and the virtual CU # in another physical storage apparatus. "B" represents the physical cal port in the physical storage apparatus #n. The table indicates that a logical path is formed between the physical port "B" and the virtual CU 00, . . . .

In order to set the tables T5 and T6 in the shared memory, the storage administrator inputs the physical path #, the physical port # in the relevant storage apparatus, and the connection destination virtual CU # using the setting screen. Next, the above described ELP processing is executed based on the input information. If the ELP processing ends without problem, the information is set in empty areas for the physical path # in the control table. The table T7 is a table showing the correspondence between virtual areas and real storage areas in the physical storage apparatus #0. The table T8 contains similar information for the physical storage apparatus #n.

Each physical storage apparatus has the above described control tables relating to its own apparatus, but it may also have the tables relating to another physical storage apparatus. Alternatively, a computer connected to the communication network, such as the SW management terminal, may have the control tables relating to all physical storage apparatuses so that the channel adapters in each physical storage apparatus can refer to those tables.

Next, processing performed when an I/O request is sent from the host computer to a virtual logical area in a physical storage apparatus will be described. As an example, processing performed when an I/O request is sent from the host computer #0 (10) to the virtual CU #n1/virtual DEV #1 in the physical storage apparatus #n (14) will be described below with reference to FIGS. 4 and 5.

Figure 4:
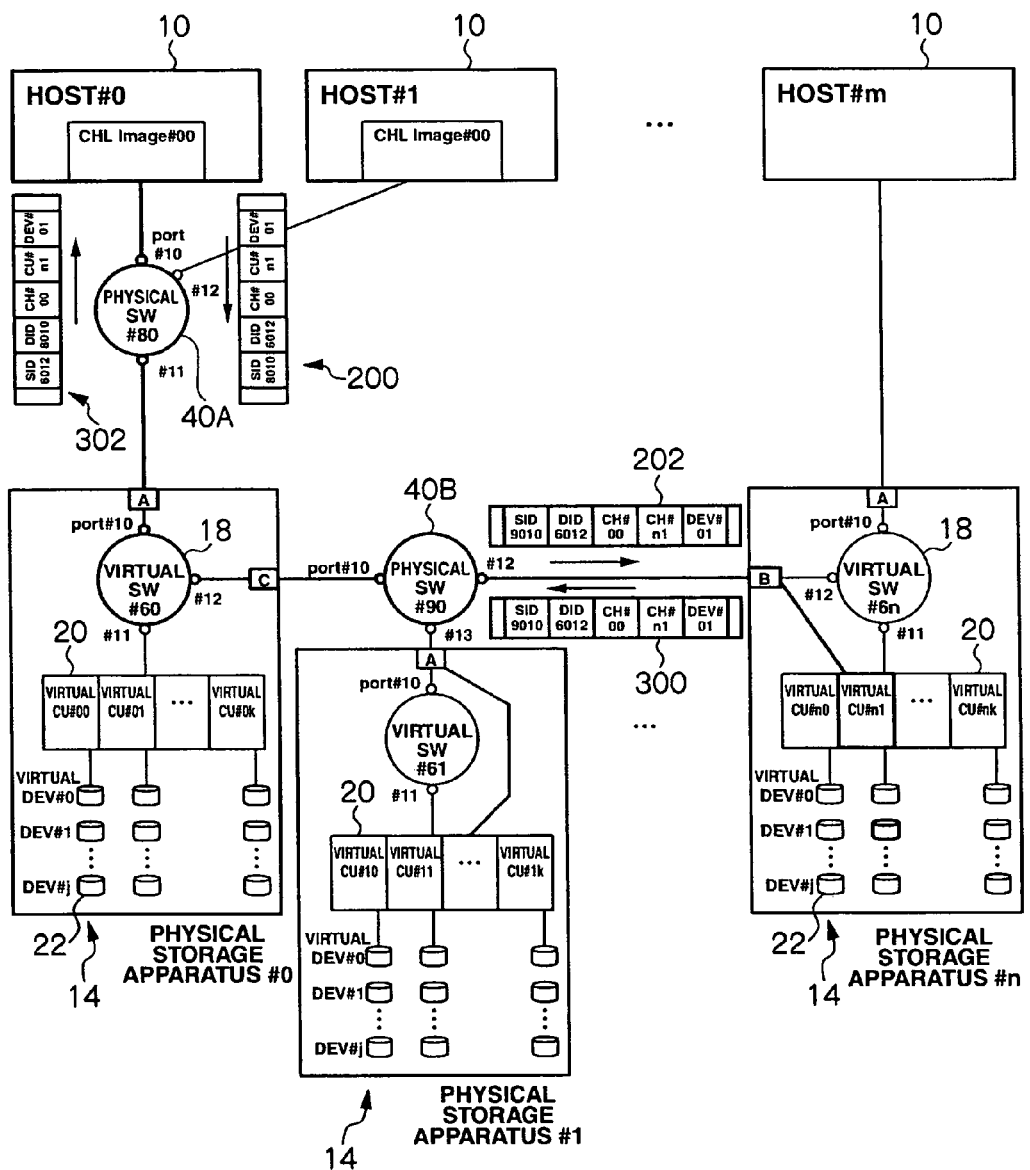
FIG. 4 is a block diagram illustrating storage system operations according to the present invention.

In the example shown in FIG. 4, the communication network 12 includes a physical switch #80 (40A) having physical ports #10, #11, and #12, and a physical switch #90 (40B) having physical ports #10, #12, and #13. A CHL Image #00 in the host computer #10 is connected to the physical port #10 in the physical switch #80.

A physical port A in the physical storage apparatus #0 (14) is connected to the port #11 in the switch #80 and also to the virtual port #10 in the virtual switch #60. The physical port #12 in the physical switch #80 is connected to the host #1.

The virtual port #11 in the virtual switch #60 is connected to the virtual CUs in the physical storage apparatus #0. The virtual port #12 is connected to the physical switch C in the physical storage apparatus #0. The physical switch C is connected to the physical port #10 in the physical switch #90.

The physical port #13 in the physical switch #90 is connected to the physical port A in the physical storage apparatus #1. The physical port A is connected to the virtual port #10 in the virtual switch #61. The virtual port #11 in the virtual switch #61 is connected to the virtual CUs in the physical storage apparatus #1.

The physical port #12 in the physical switch #90 is connected to the physical port B in the physical storage apparatus #n. The physical port B is connected to the virtual port #12 in the virtual switch #6n in the physical storage apparatus #n. The virtual port #11 in the virtual switch #6n is connected to the virtual CUs in the physical storage apparatus #n. The virtual port #10 is connected to the physical port A in the physical storage apparatus #6n. The physical port A is connected to the host computer #n.

Figure 5:
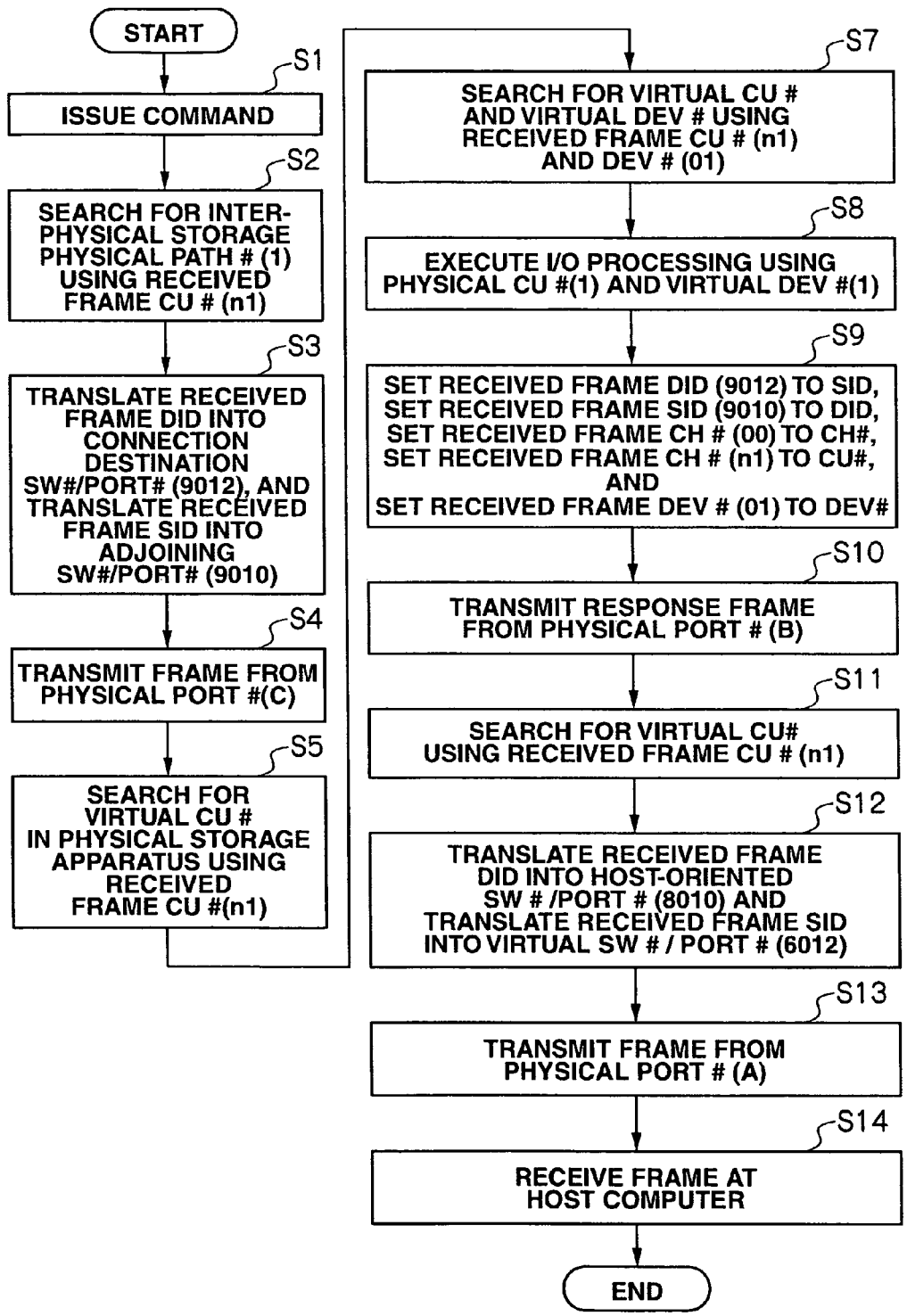
FIG. 5 is a flowchart illustrating processing performed when an I/O request is issued.

Processing for a command issued by the host will be described with reference to FIG. 5. The host computer #0 (10) issues a frame 200 to the physical switch #80 (S1 in FIG. 5). This frame is targeted at the virtual DEV #1 connected to the virtual CU #n1 in the physical storage apparatus #n.

SID (Source Identification) 8010, DID (Destination Identification) 6012, CH (CHL Image) #00, CU #n1, and DEV #01 are added to the frame 200. "80" and "10" in SID "8010" respectively mean the physical switch #80 and the physical port #10 in the physical switch #80. "60" and "12" in the DID "6012" respectively mean the virtual switch #60 and the virtual port #12.

Next, when the physical storage apparatus #0 receives the frame 200, the channel adapter 24 searches the table T5 for the physical path # according to the access target CU # (n1) added to the frame 200, and recognizes the port "C" the frame has to be sent to (S2). The channel adapter 24 determines that the access target CU #n1 is not included in its own virtual CUs and that the CU# n1 belongs to the physical storage apparatus #n. Then the channel adapter in the physical storage apparatus

0 translates, according to the control table T3, the received DID of the frame 200 into the physical switch #/port # (9012) connected to the physical port C, translates the SID of the received frame 200 into the adjoining switch #/port # (9010) acquired when linkup is established (S3), and directs the frame 202 from the physical port C. This frame 202 is directed, via the physical switch #90, to the physical storage apparatus #n.

When the physical storage apparatus #n receives the frame 202, the channel adapter 24 searches the table T6 for the virtual CU # according to the CU # (n1) of the received frame 202 (S5). If the physical path # cannot be acquired and no relevant information exists, the channel adapter 24 determines that the access has been made to its own apparatus.

Next, the channel adapter 24 in the physical storage apparatus #n searches the table T8 for the virtual CU # and virtual DEV # according to the CU # (n1) and DEV # (01) of the received frame 202, and acquires the physical storage apparatus # (n), physical CU # (1), and physical DEV # (1) (S7). In this example, because the relevant physical storage apparatus is the physical storage apparatus #n (14), the disk adapter 30 executes the same processing as usual I/O processing according to the physical CU # (1) and physical DEV # (1) (S8). In other words, the disk adapter 30 executes processing for accessing a storage area in the disk 32 specified by the frame.

Next, the physical storage apparatus #n produces a frame (response frame) 300 for responding to the received frame 202 after the I/O processing is executed. For example, the physical storage apparatus #n, referring to information about the received frame 202, sets the DID (9012) of the received frame 202 as the SID of the response frame 300, the SID (9010) of the received frame 202 as the DID of the response frame 300, the CH# (00) of the received frame 202 as the CH# of the response frame 300, the CU # (n1) of the received frame 202 as the CU # of the response frame 300, and the DEV # (01) of the received frame 202 as the DEV # of the response frame 300 (S9), and transmits the response frame 300 from the physical port B.

When the physical storage apparatus #0 (14) receives the response frame 300 via the physical switch #90 (40), the physical storage apparatus #0 searches the table T2 for the virtual CU # according to the CU # (n1) of the response frame 300, and acquires the host-directed physical path # (1) (Si1). Here, the physical storage apparatus #0 (14) translates the DID of the response frame 300 into the host switch #/port # (8010) based on the acquired physical path # (1), and also translates the SID of the response frame 300 into the virtual switch #/port # (6010) (S12), and transmits the response frame 302 from the physical port A (S13). After that, the response frame 302 is received by the host computer #0 (10) (S14), and the processing according to the routine shown in FIG. 5 ends.

Figure 6:
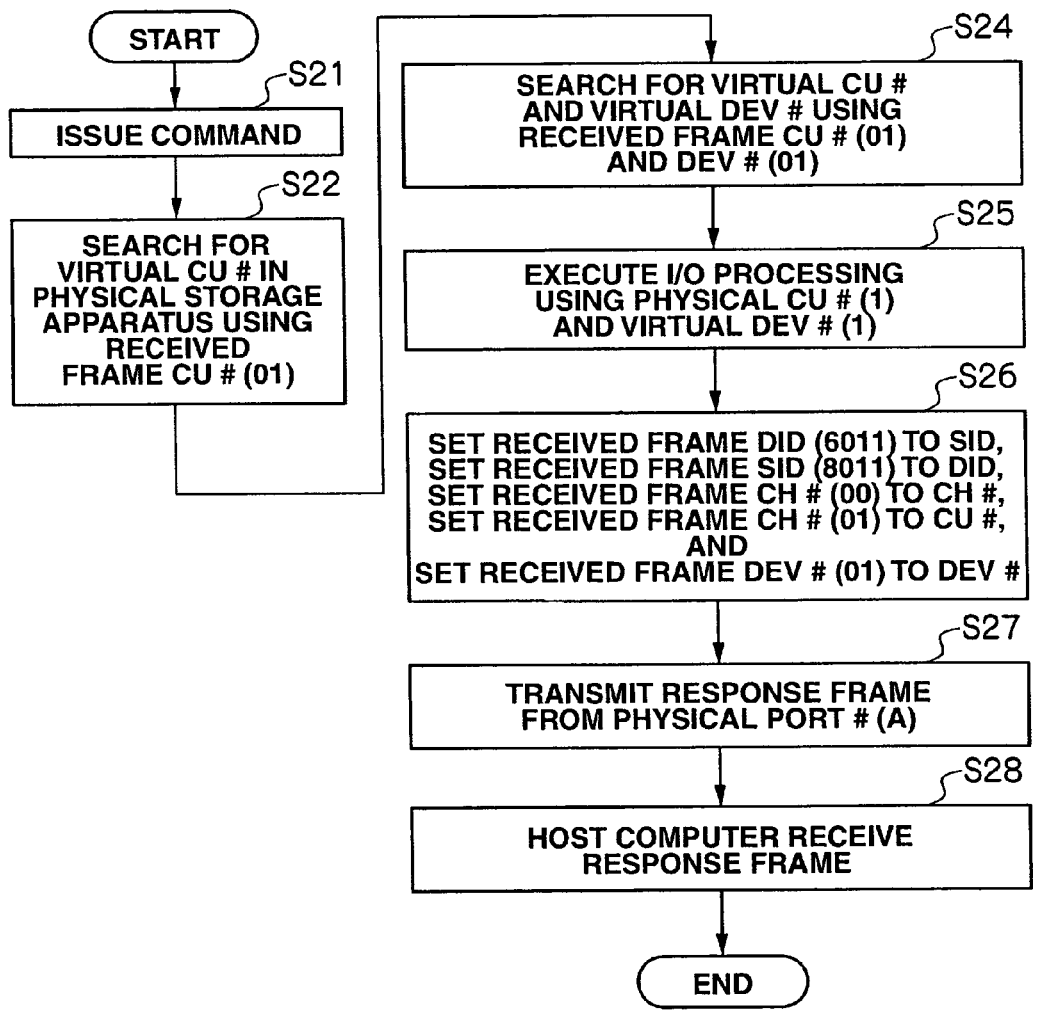
FIG. 6 is a flowchart illustrating other processing performed when an I/O request is issued.

Next, processing performed when an I/O request is sent from the host computer #0 (10) to the virtual CU #01/virtual DEV #1 in the physical storage apparatus #0 (14) will be described with reference to FIGS. 4 and 6. First, the host computer #0 (10) issues a frame, via the port #10 in the physical switch #80 (40), to the virtual DEV #1 connected to the virtual CU #01 that is under the management of the virtual switch #60 (18) (S21). Information including SID=8010, DID=6011, CH#=00, CU #=01, and DEV #=1 has been added to that frame.

Next, when the physical storage apparatus #0 (14) receives the frame from the host computer 10, the physical storage apparatus #0 (14) searches the table T5 for the virtual CU # according to the CU # (01) of the received frame (S22). If no relevant information exists, the physical storage apparatus #0 judges that the access has been made to its own physical storage apparatus. Then the physical storage apparatus #0 (14) searches the table T7 for the virtual CU # and virtual DEV # according to the CU # and DEV # of the received frame, and specifies the physical storage apparatus # (0), physical CU # (1), and physical DEV # (1) of the final access target of the frame (S24). After that, normal I/O processing is executed on the physical CU # (1) and physical DEV # (1) (S25).

Next, the physical storage apparatus #0 (14) produces a response frame after executing the I/0 processing. The physical storage apparatus #0, using the received frame, sets the DID (6011) of the received frame as the SID of the response frame, the SID (8010) of the received frame as the DID of the response frame, the CH# (00) of the received frame as the CH# of the response frame, the CU # (01) of the received frame as the CU # of the response frame, and the DEV # (01) of the received frame (S26) as the DEV # of the response frame, and transmits the response frame from the physical port A (S27). Information including SID=6011, DID=8010, CH#=0, CU #=0, DEV #=1 is added to the response frame. This response frame is received by the host computer #0 (10) (S28), and then the processing according to this routine ends.

Figure 7:
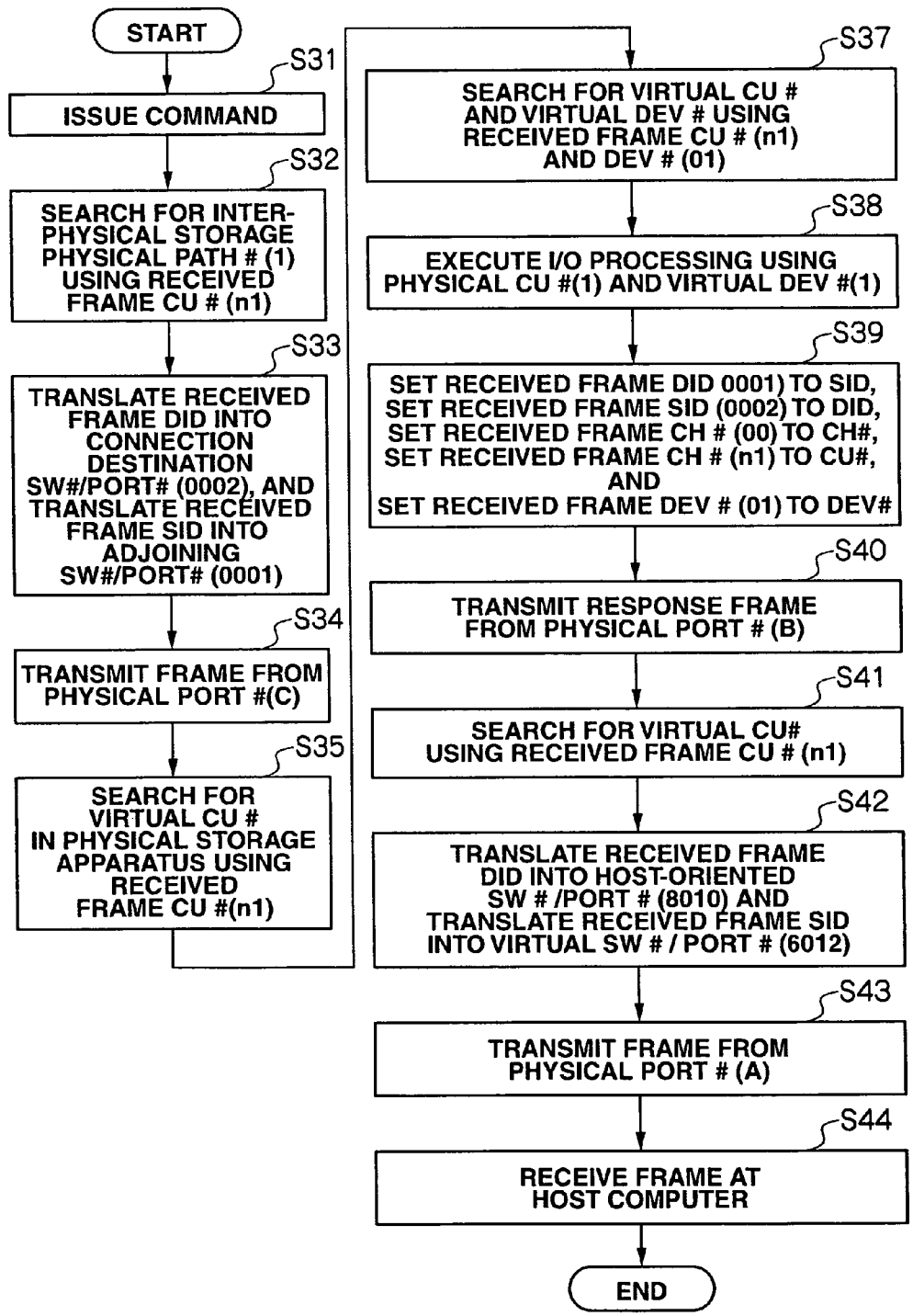
FIG. 7 is a flowchart illustrating other processing when an I/O request is issued.
Figure 8:
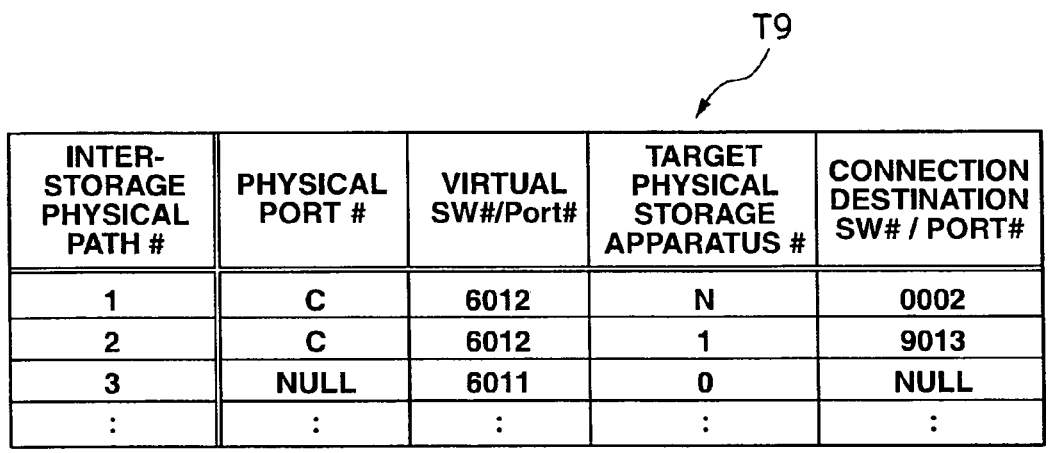
FIG. 8 is a diagram showing a table of physical paths between physical storage devices.

Next, processing performed when an I/O request is sent from the host computer #0 (10) to the virtual CU #n1/virtual DEV #1 in the physical storage apparatus #n (14) will be described with reference to FIGS. 4 and 7. In this embodiment, the connection between the physical storage apparatuses #0 and #n (14) is made not via a physical switch, but with a point-to-point connection, and the therefore table T9 shown in FIG. 8 is used instead of table T3.

First, the host computer #0 (10) issues a frame, via the port #10 in the physical switch #80 (40), to the virtual DEV #1 connected to the virtual CU #n1 that is under the management of the virtual switch #60 (18) (S31). Information including SID=8010, DID=6012, CH#=00, CU #=n1, and DEV #=1 has been added to that frame.

Next, the physical storage apparatus #0 (14), when receiving the command issued by the host computer #0 (10), searches the table T5 for the virtual CU # using the CU # (n1) of the received frame and acquires the inter-physical storage physical path # (S32). Then the physical storage apparatus #0 (14) searches the table T9 using the acquired physical path #, translates the received frame DID and SID respectively into the connection destination switch #/port # (0002) and the adjoining switch #/port # (0001) acquired when linkup was established (S33), and transmits the frame from the physical port C (S34). Information including SID=0001, DID=0002, CH#=00, CU #=n1, and DEV #=1 has been added to that frame.

Next, the physical storage apparatus #n (14) searches, after receiving the command (frame) transmitted from the physical storage apparatus #0 (14), the table T6 for the virtual CU # using the CU # (n1) of the received frame (S35) and determines whether or not the relevant information exists. If no relevant information exists, the physical storage apparatus #n judges that the access has been made to its own physical storage.

After that, the physical storage apparatus #n (14) searches the table T8 for the virtual CU # and virtual DEV # using the CU # (n1) and DEV # (01) of the frame, and acquires the physical storage apparatus # (N), physical CU # (1), and physical DEV # (1) (S37). Because the access target here is the physical storage apparatus #n, the physical storage apparatus #n executes usual I/O processing on the physical CU # (1) and physical DEV # (1) (S38).

Subsequently, the physical storage apparatus #n (14) performs processing for producing a response frame after the above I/O processing. In that processing, the physical storage apparatus #n (14) sets, using the received frame, the DID (0001) of the received frame as the SID of the response frame, the SID (0002) of the received frame as the DID of the response frame, the CH# (00) of the received frame as the CH# of the response frame, the CU # (01) of the received frame as the CU # of the response frame, and the DEV # of the received frame as the DEV # of the response frame (S39), and transmits the response frame from the physical port B (S40). Information including SID=0002, DID=0001, CH#=00, CU=n1, and DEV #=1 has been added to that response frame.

The physical storage apparatus #0 (14) searches, after receiving the response frame #0 from the physical storage apparatus #n (14), the table T2 for the virtual CU # using the response frame CU # (n1), and acquires the host-directed physical path # (1) (S41). The physical storage apparatus #0 (14) translates the response frame DID and SID respectively into the physical switch SW #/port # 8010 and the virtual switch #/port # 6010 based on the acquired physical path # (1) (S42), and transmits the response frame from the physical port A (S43). Information including SID=6012, DID=8010, CH#=00, CU #=n1, and DEV #=1 has been added to that response frame. The response frame is received by the host computer #0 (10) (S44), and then the processing according to this routine ends.

Figure 9:
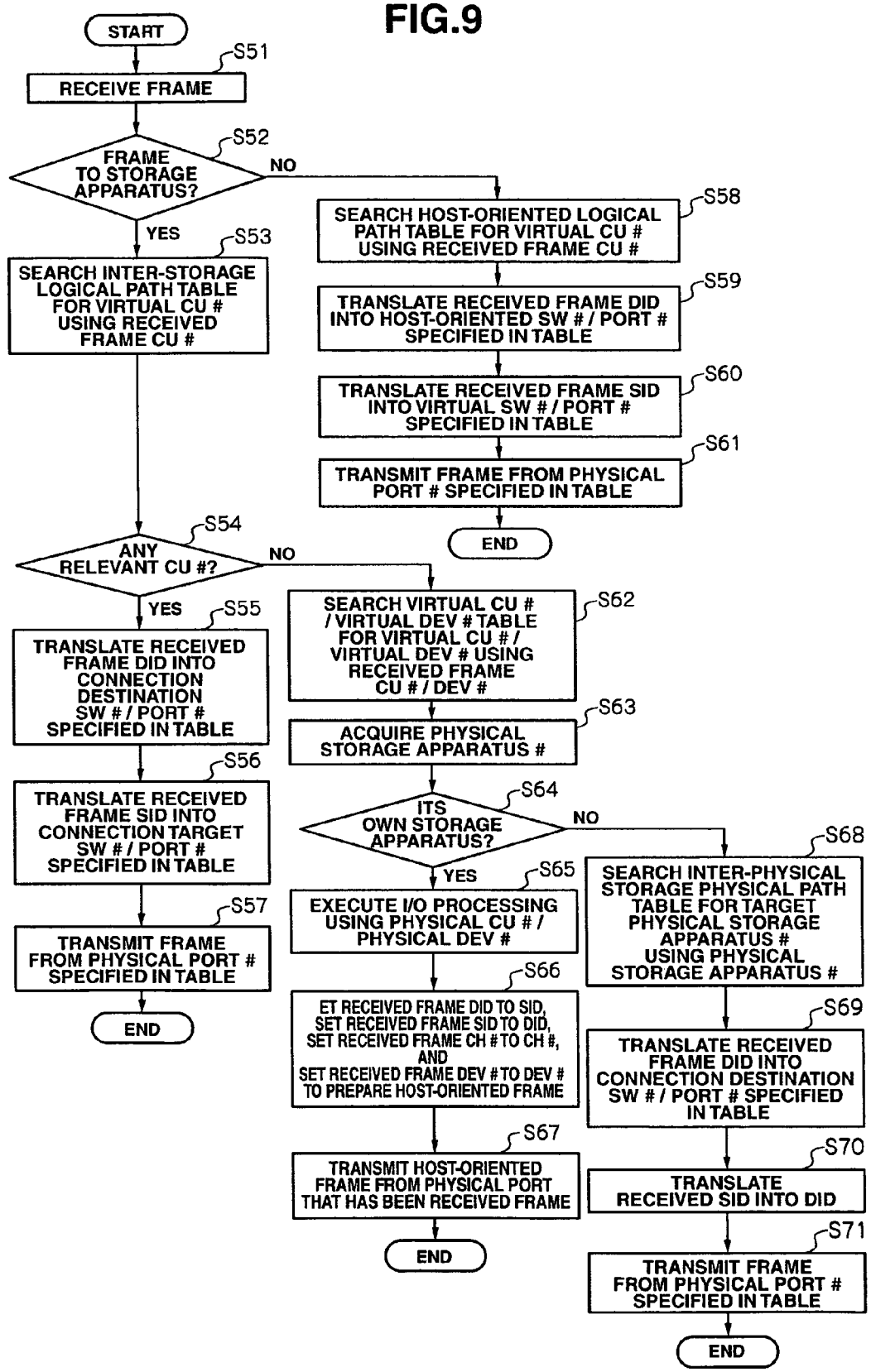
FIG. 9 is a flowchart illustrating processing in a physical storage apparatus when a frame is transmitted/received.

Next, processing performed when each physical storage apparatus 14 transmits/receives a frame will be described with reference to FIG. 9. First, the physical storage apparatus 14 judges, after receiving the frame (S51), whether or not the frame is targeted at its own physical storage apparatus 14 (S52). If the frame is targeted at its own physical storage apparatus 14, the physical storage apparatus 14 searches the table T5 or T6 for the virtual CU # according to the received frame CU # (S53), and determines whether or not the relevant CU # exists (S54).

If the relevant CU # exists, the physical storage apparatus 14 translates the received frame DID into the connection destination switch #/port # specified in the table T3 or T4 (S55), also translates the received frame SID into the adjoining switch #/port # specified in the table T3 or T4 (S56), and directs the frame from the physical port # specified in the table T3 or T4 (S57), and then the processing according to this routine ends.

Meanwhile, if the physical storage apparatus 14 determines that the frame is not targeted at its own physical storage apparatus in step S52, the physical storage apparatus 14 searches the table T2 for the virtual CU # according to the received frame CU # (S58), translates the received frame DID into the host-directed physical switch #/port # specified in the table T1 (S59), also translates the received frame SID into the virtual switch #/port # specified in the table T1 (S60), and directs the frame from the port # specified in the table T1 (S61), and then the processing according to this routine ends here.

If the physical storage apparatus 14 determines in step S54 that no relevant CU # exists, the physical storage apparatus 14 searches the table T7 or T8 for the virtual CU #/virtual DEV # according to the received frame CU #/DEV # (S62), acquires the physical storage apparatus # (S63), and judges whether or not the acquired physical storage apparatus # is its own storage apparatus (S64). The physical storage apparatus 14 executes, having judged that the physical storage apparatus # is its own apparatus, usual I/O processing on the physical CU #/physical DEV # (S65), produces a frame targeted at the host by setting the received frame DID as the SID, the received frame DID as the SID, the received CH # as the CH # the received frame CU # as the CU #, and the received frame DEV # as the DEV # (S66), and transmits the above produced frame from the physical port that has received the frame (S67), and then the processing according to this routine ends.

Meanwhile, if the physical storage apparatus judges in step S64 that the acquired physical storage apparatus # is not its own storage apparatus, the physical storage apparatus 14 searches the table T3 or T4 for the target physical storage apparatus # according to the above physical storage apparatus # (S68), translates the received frame DID into the connection target switch #/port # specified in the table T3 or T4 (S69), also translates the received SID into DID (S70), and directs the frame from the physical port # indicated in the table T3 or T4 (S71), and then the processing according to this routine ends.

According to the above described embodiment, real storage device elements (real disk(s) 32) in each disk storage apparatus (physical storage apparatus) 14 are virtualized into logical elements. Because the channel adapter 24 that controls the logical elements specifies a command from the host computer based on storage configuration information where physical elements including the disks 32, which are the real storage devices, and the disk adapter 30 are mapped to the respective physical storage apparatuses 14, a plurality of storage subsystems can be integrally managed by virtualizing the physical storage devices.

Moreover, a command contains the identification information for individually specifying a group of the virtual device groups 22 and a plurality of virtual controller units 20 in each physical storage apparatus 14 and the information indicating the command transmission source and transmission target. Accordingly, if the physical storage apparatus configuration is changed, only change in the virtual/physical mapping in the physical storage apparatus is necessary, and the system generation in the host computer does not have to be changed.

Because a plurality of disk storage apparatuses can be integrally managed by utilizing virtualization, paths between the host systems and disk storage apparatuses can be consolidated, and all disk storage apparatuses can be accessed with a small number of host paths. Moreover, by changing the storage configuration information according to loads, the loads can be shared between the disk storage apparatuses 14. Loads can be divided by using remote copy between the physical storage apparatuses 14 or shadow imaging in each physical storage apparatus 14. The "loads" include an RAID load in all physical storage apparatuses 14, a processor load in each physical storage apparatus 14, loads in paths or switches between the physical storage apparatuses, and so on.

Although the above embodiment has been described based on a mainframe system, the present invention can also be applied to an open system. In that case, the open system does not have the same system generation as in the mainframe system, but the virtual switch is realized in the disk storage apparatuses in the same way as the above described embodiment.

Next, processing performed when a drive failure occurs while an I/O request is sent from the host computer #0 (14) to the virtual CU #/virtual DEV #1 in the physical storage apparatus #n (14), being processing for a drive failure/disk adapter section failure (drive path failure) occurrence, will be described with reference to FIGS. 10 and 11. Steps S81-S84 in the processing performed after the host computer #0 (14) issues a command until the command frame arrives at the physical storage apparatus #n are the same as steps S1-S4 in FIG. 5.

Figure 12:
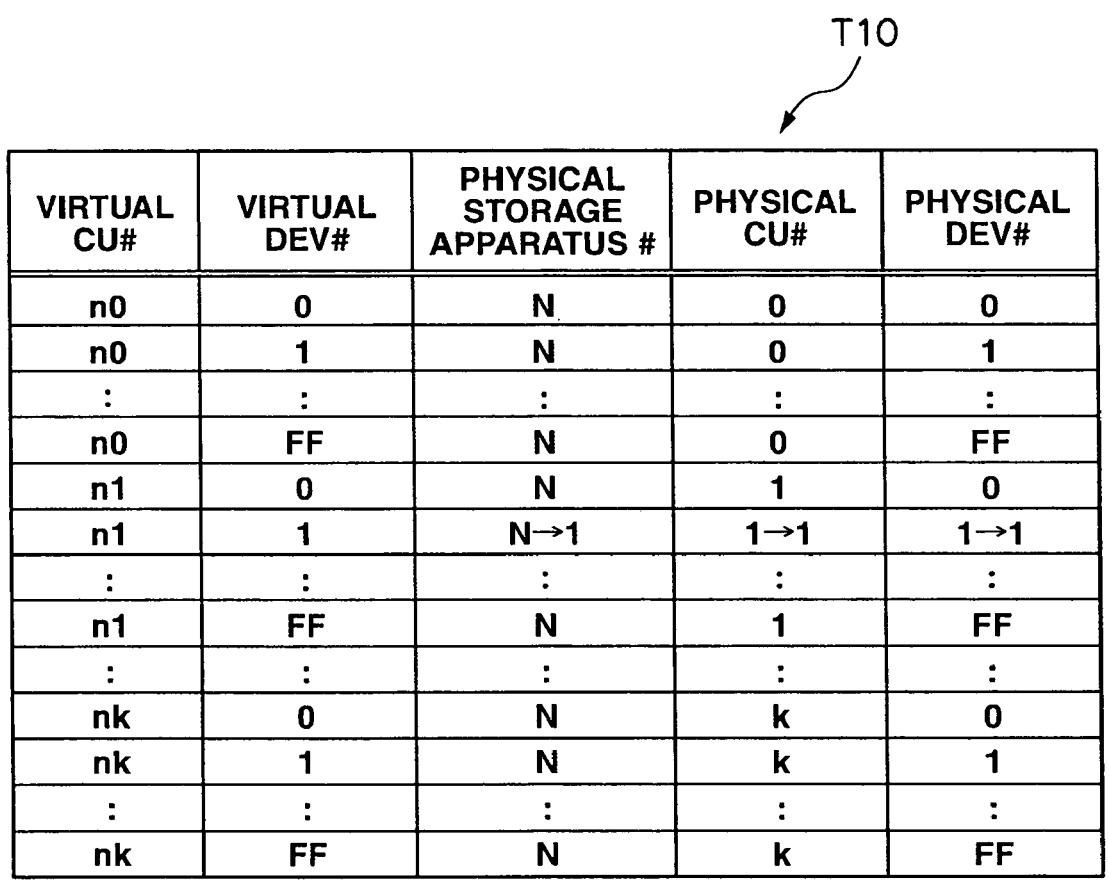
FIG. 12 is a diagram showing a table of virtual CU(s)/virtual DEV(s) in physical storage apparatuses.

After that, if a drive failure is detected when the physical storage apparatus #n (14) receives the frame 202, the table 10 shown in FIG. 12 is used instead of the table T8. The table T10 is produced by duplicating the table T8 via remote copy, for redundancy. Regarding virtual CU #n1/virtual DEV #1 in that duplication, the physical CU #1/physical DEV #1 in the physical storage apparatus #n is set as the main device, and the physical CU # 1/physical DEV # 1 in the physical storage apparatus #1 is set as the sub device.

In other words, by duplicating the table for the main and sub devices, like the table 10, even if a failure occurs in the physical storage apparatus # 1/physical CU #/physical DEV # 1 that is the main device, the same data in the sub device. can be accessed without performing data recovery operation. Even in one physical storage apparatus, duplication can be performed using a shadow image. If duplication is not managed by any function of the storage apparatus, data can also be recovered by restoring the virtual CU #n1/virtual DEV #1 acquired via the host computer 10 to the physical storage apparatus # 1/physical CU #1/physical DEV #1 by using the backup data, without the need for recovering a failure section in the physical storage apparatus #N/physical CU #1/physical DEV #1.

The physical storage apparatus #n (14) searches, when receiving the frame 202, the table T6 for the virtual CU # using the received frame CU # (n1) (S85), and determines whether the relevant information exists. If no relevant information exists, the physical storage apparatus #n (14) judges that the request is targeted at its own physical storage apparatus. After that, the physical storage apparatus #n (14) searches the table T10 for the virtual CU # and virtual DEV # using the received frame CU # (n1) and DEV # (01) (S87), and acquires the physical storage apparatus # (1), physical CU # (1), and physical DEV # (1). If the request is not targeted at its own physical storage apparatus, the physical storage apparatus #0 searches the table T4 for the target physical storage apparatus # according to the physical storage apparatus # (1) and acquires the physical path # (2) (S89). Then the physical storage apparatus #n (14) translates, based on the acquired physical path (2), the received frame DID and SID respectively into the connection destination switch #/port # (9013) and the received frame DID (9012) (S90), and transmits the response frame 300 from the physical port B (S91). The physical storage apparatus #1, when receiving the response frame 300, executes I/O processing (S92), and then the processing according to this routine ends.

According to this embodiment, data access is enabled even when a drive failure/disk adapter section failure (drive path failure) occurs.

Figure 10:
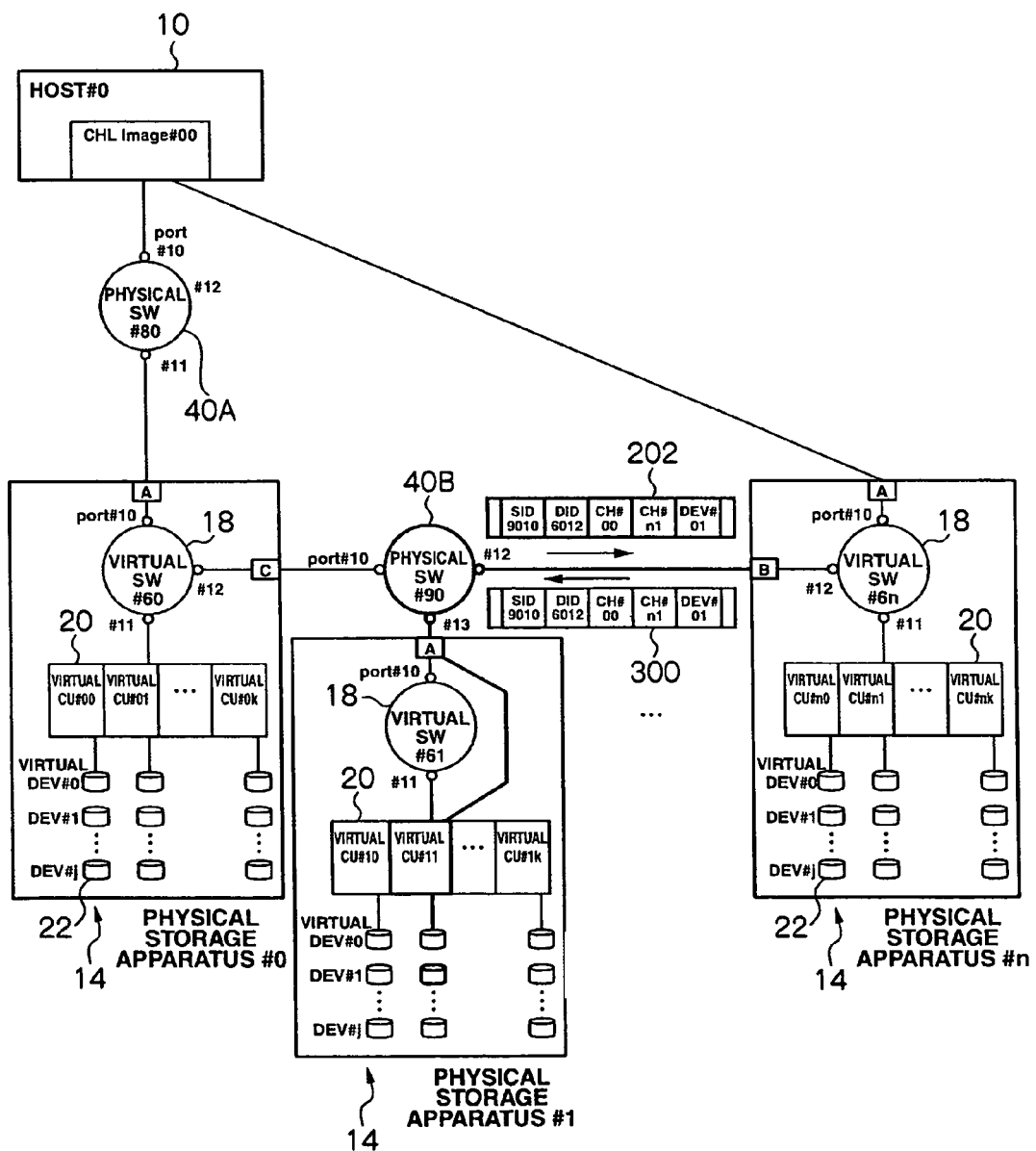
FIG. 10 is a block diagram illustrating processing performed when a failure occurs.
Figure 11:
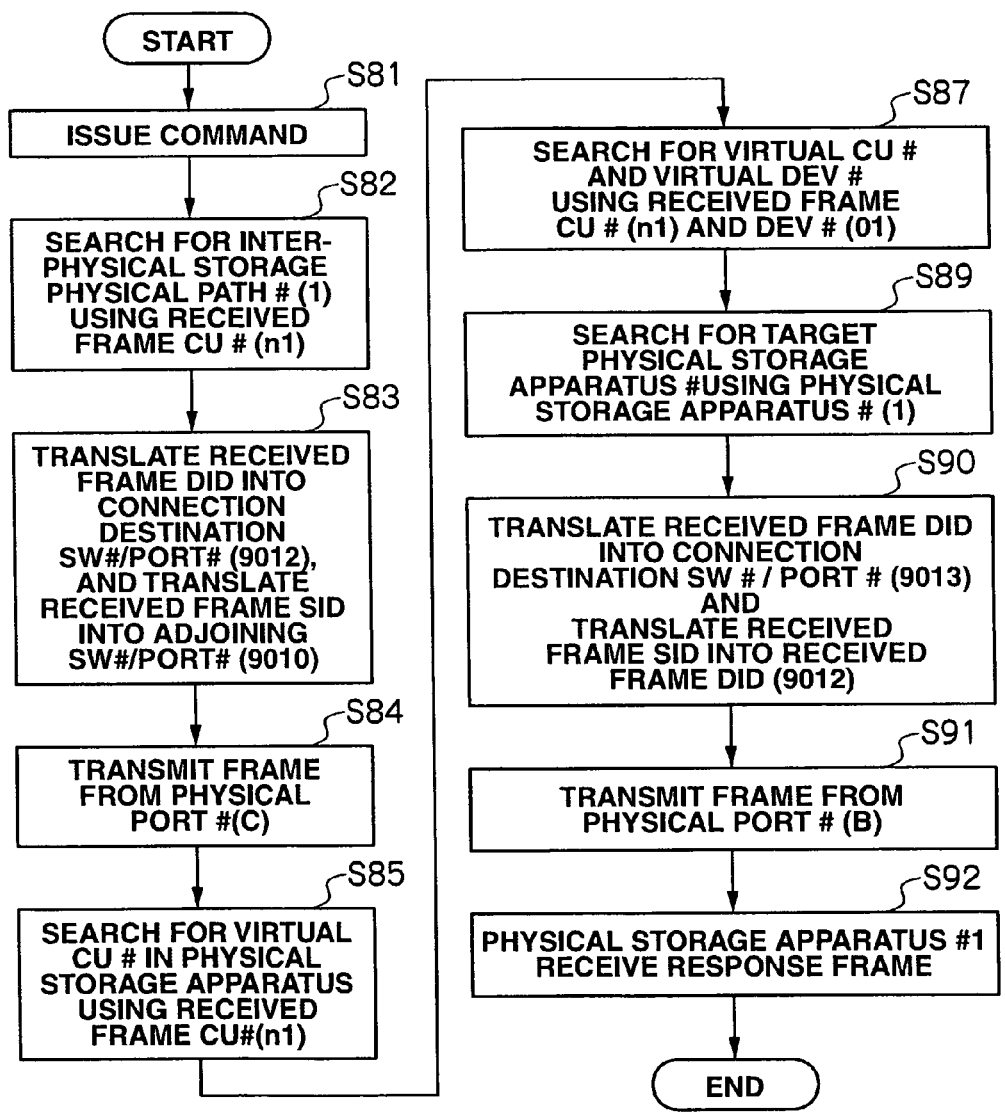
FIG. 11 is a flowchart illustrating an operation performed when a failure occurs.

Even if a host path failure/channel adapter section failure occurs, data access is enabled by using an alternate path (a host path to physical storage apparatus #n (14)) if a failure in the host path (the path to the physical storage apparatus #0 (14) in FIG. 10) is detected when an I/O request is sent from the host computer #0 (10) to the virtual CU #n1/virtual DEV #1 in the physical storage apparatus #n (14). In that case, the host computer #0 (10) selects any one of the grouped paths defined in the system generation and issues an I/O request. The method for selecting the path depends on the manufacturer of the host computer 10 or other factors. However, even if a malfunctioning path exists, I/O can be issued via any one of the other paths. Accordingly, the path selecting method in the host computer 10 does not have to be changed.

Figure 13:
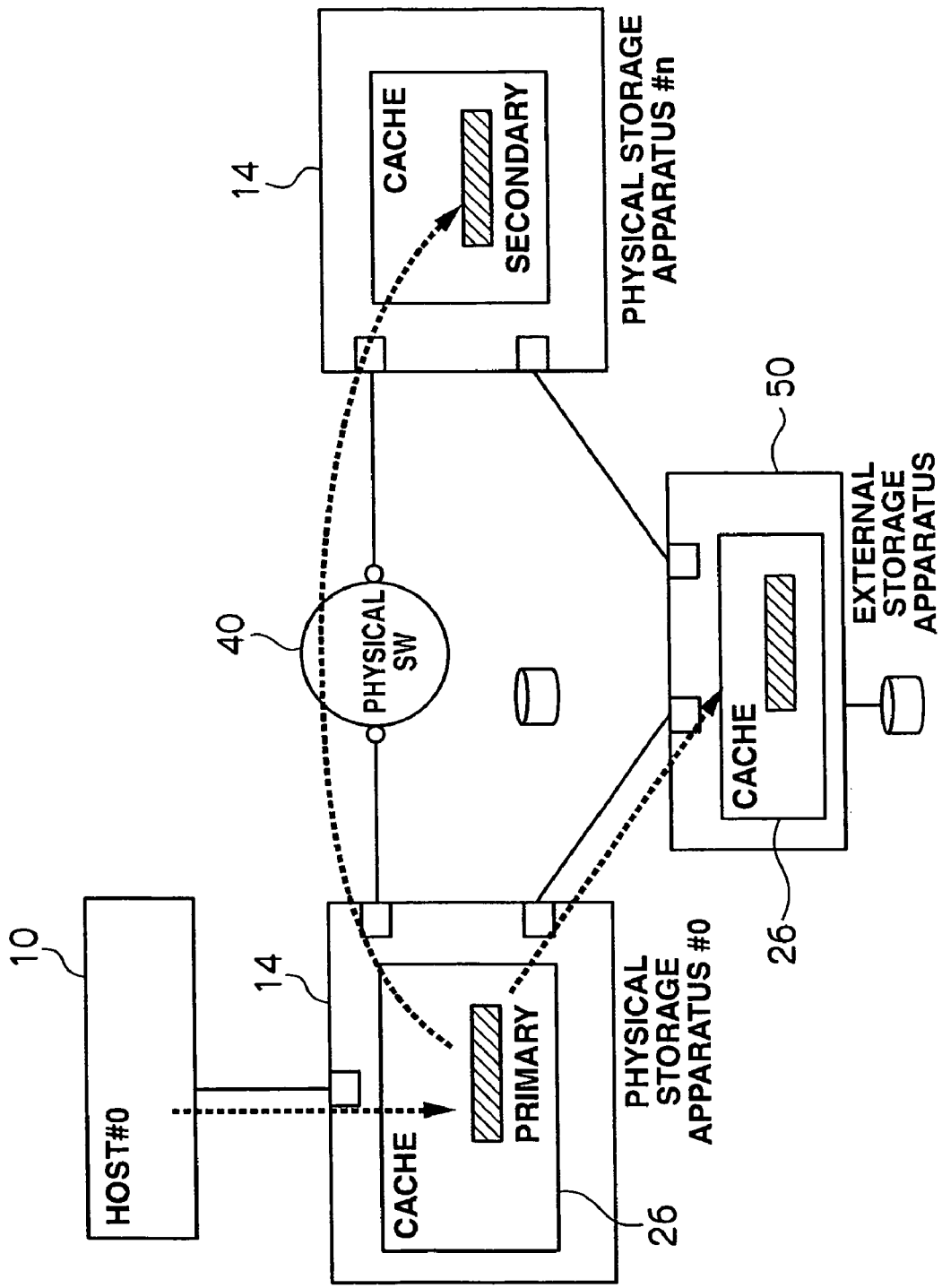
FIG. 13 is a block diagram illustrating a double management configuration.

Next, the duplicate management configuration using remote copy and an external storage apparatus will be described with reference to FIG. 13.

When the duplicate management is performed by using both remote copy and an external storage apparatus 50, the cache memory 26 in the physical storage apparatus #0 (14) and that in the physical storage apparatus #n (14) are used respectively as the primary and secondary memory the physical storage apparatuses #0 and #n share the cache memory 26 in the external storage apparatus 50; and data is stored in and double-managed by the physical storage 14 and the external storage apparatus 50. By doing so, data access is enabled even when a failure occurs in the cache 26 or subsystems.

Figure 14:
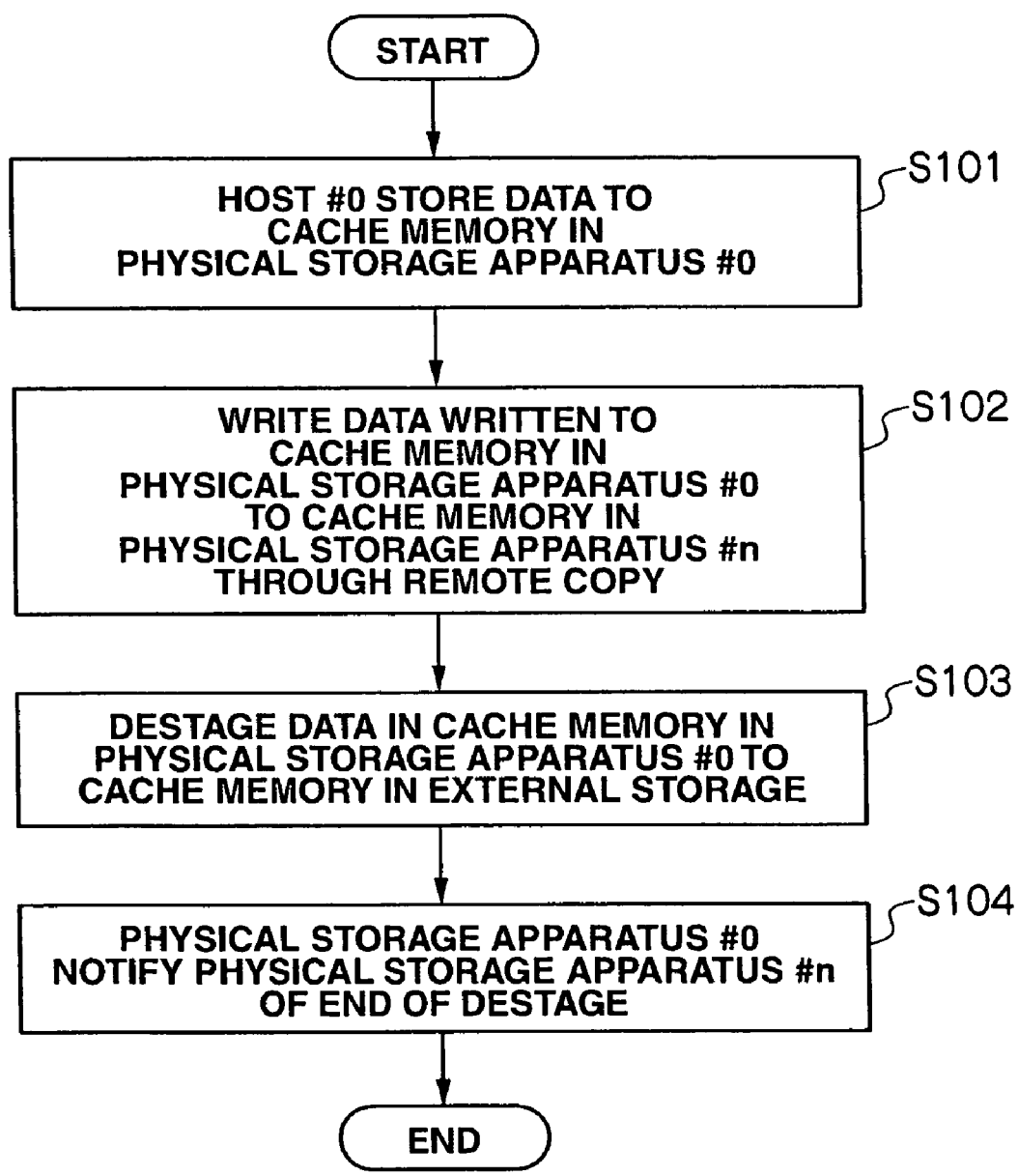
FIG. 14 is a flowchart illustrating a double management configuration.

More specifically, as shown in FIG. 14, the host computer #0 (10) writes data to the cache 26 in the physical storage apparatus #0 (14) when data write is requested (S101). Then the data written to the cache 26 in the physical storage apparatus #0 (14) is written to the cache memory 26 in the physical storage apparatus #n (14) via remote copy (S102). Subsequently, data in the primary memory in the physical storage apparatus #0 (14) is destaged to the external storage apparatus 50 if no failure occurs (S104). After the destage, the physical storage apparatus #0 (14) communicates "end of destage" to the physical storage apparatus #n (14), and then the processing according to this routine ends.

By destaging the primary data in the physical storage apparatus #0 (14) to the external storage apparatus 50, dirty data in the secondary memory in the physical storage apparatus #n can be released. Even if a subsystem failure occurs in the physical storage apparatus #0 (14) during the above processing, data can be accessed by accessing the external storage apparatus 50 via the physical storage apparatus #n (14) as the data has already been destaged and released.

Alternatively, the dirty data may be left as it is in the physical storage apparatus #n (14) without performing the communication. In that case, if a subsystem failure in the physical storage apparatus #0 occurs, data has not yet been destaged to the external storage apparatus 50 at the point in time of failure occurrence. Accordingly, the dirty data may be destaged when the failure occurs in the physical storage apparatus #0 (14), which has the primary memory, and then the data can be accessed. Alternatively, the device can be physically double-managed through remote copy, without sharing the device in the external storage apparatus 50.

According to this embodiment, the cache memory 26 in the physical storage apparatus #0 (14) is set as primary memory, the cache 26 in the physical storage apparatus #n (14) is set as secondary memory, and data is double-managed by both physical storage apparatuses 14 by sharing the cache memory 26 in the external storage apparatus 50. Accordingly, data access is enabled even if a failure occurs in the cache 26 or subsystems.

What is claimed is:

1. A storage system having a plurality of storage apparatuses, each of said plurality of storage apparatuses comprising:
   a plurality of channel adapters for receiving access commands from a plurality of host computers via network;
   a plurality of disk devices with which said plurality of storage apparatuses provide control units which are virtual storage areas to the host computer;
   a plurality of disk adapters for controlling said plurality of disk devices; and
   a memory for storing information,
   wherein said plurality of storage apparatuses are connected to each other via a physical switch, and each of said plurality of storage apparatuses provides a virtual switch,
   wherein said information relates each of identifiers of said control units to each of identifiers of said plurality of storage apparatuses, and relates each of identifiers of the storage apparatuses to each of identifiers of ports of said physical switch or said virtual switch, said information stored in a first memory of a first storage apparatus relates an identifier of a second control unit provided by a second storage apparatus to an identifier of said second storage apparatus, an identifier of said second storage apparatus to an identifier of a second port of said physical switch, said second port is one of a plurality of ports of said physical switch and connected to said second storage apparatus, wherein if said first storage apparatus receives a first access command including an identifier of a first port of a first virtual switch provided by said first storage apparatus and an identifier of a first control unit provided by said first storage apparatus, from said host computer, a first channel adapter in said first storage apparatus sends said first access command to a first disk adapter of said first storage apparatus, based on said identifier of said first control unit included in said first access command and said information, wherein if said first storage apparatus receives a second access command including said identifier of said first port of said first virtual switch and said identifier of said second control unit from said host computer, said first channel adapter changes said identifier of said first port of said first virtual switch to said identifier of a second port of said physical switch, based on an identifier of said second control unit included in said second access command and said information, and sends said changed second access command to said second storage apparatus via said physical switch, and wherein said identifier of said first control unit, said identifier of second control unit, said identifier of said first port of said first virtual switch, and said identifier of said second port of said physical switch are uniquely identified within the storage system.

2. The storage system according to claim 1,
wherein said second storage apparatus provides a second virtual switch, and
said storage system provides said physical switch between said first virtual switch and said second virtual switch.

3. The storage system according to claim 2,
wherein said second control unit is connected to said host computer via a first path or a second path,
said first path is a path from said second control unit to said host computer through said second virtual switch, and
said second path is a path from said second control unit to said host computer via said second virtual switch, said physical switch and said first virtual switch.

4. The storage system according to claim 1,
wherein a third storage apparatus is provides with a second control unit and a third virtual switch, said third control unit is connected to said host computer via said third virtual switch, said physical switch and said first virtual switch,
wherein said information relates an identifier of said third control unit to an identifier of said third storage apparatus, and relates said identifier of third storage apparatus to an identifier of a third port of said physical switch, said third port is one of a plurality of ports of said physical switch and connected to said third storage apparatus, and
wherein if said first storage apparatus receives a third access command including said identifier of said first port of said first virtual switch provided by said first storage apparatus and said identifier of said third control unit from said host computer, said first channel adapter changes said identifier of said first port of said first virtual switch to said identifier of a third port of said physical switch, based on an identifier of said third control unit included in said changed third access command and said information, and sends said changed third access command to third storage apparatus via said physical switch.

5. The storage system according to claim 1,
wherein said first access command and said second access command from said host computer further includes an identifier of a forth port of host computer, said identifier of said forth port of host computer is included as a S_ID, and said identifier of said first port of said first virtual switch is includes as D_ID.

6. The storage system according to claim 5,
wherein said information further relates an identifier of first storage apparatus to an identifier of a fifth port of said physical switch, said fifth port is one of said plurality ports of physical switch and connected to said first storage apparatus, and
wherein if said first storage apparatus receives said second access command, said first channel adapter also changes said identifier of said forth port of said host computer included in said second access command as S_ID to said identifier of said fifth port of said physical switch based on said information.

7. The storage system according to claim 6,
wherein if said second storage apparatus receives said changed second command, said second storage apparatus executes said second access command, produces a response command and sets a S_ID and a DID of said response command based on a SID and a DID included in said received second access command, and sends said response command to the host computer.

8. A data control method for a storage system including a plurality of storage apparatuses that provide control units which are virtual storage areas to a host computer with a plurality of disk devices included in each of said plurality of storage apparatuses and that are connected to each other via a physical switch, comprising, under the control of each storage apparatus, the steps of:

providing a virtual switch in each of said plurality of storage apparatuses, relating each of identifiers of said control units to each of identifiers of said plurality of storage apparatuses on information stored in a memory of each of said plurality of storage apparatuses, relating each of identifiers of the storage apparatuses to each of identifiers of ports of said physical switch or said virtual switch on said information, an identifier of a second control unit provided by a second storage apparatus is related to an identifier of said second storage apparatus, an identifier of said second storage apparatus is related to an identifier of a second port of said physical switch, said second port is one of a plurality of ports of said physical switch and connected to said second storage apparatus, receiving a first access command from said host computer by said first storage apparatus, said first access command includes an identifier of a first port of a first virtual switch provided by said first storage apparatus and an identifier of a first control unit provided by said first storage apparatus, then sending to a first disk adapter in said first storage apparatus, based on said identifier of said first control unit included in said first access command and said system information, and receiving a second access command from said host computer by said first storage apparatus, said second access command includes said identifier of said first port of said first virtual switch provided by said first storage apparatus and said identifier of said second control unit, then changing said identifier of said first port of said virtual switch to said identifier of a second port of said physical switch, based on an identifier of said second control unit included in said second access command and said information, and sending said changed second access command to said second storage apparatus via said physical switch, wherein said identifier of said first control unit, said identifier of second control unit, said identifier of said first port of said virtual switch, and said identifier of said second port of said physical switch are uniquely identified within the storage system.

* * * * *

UNITED STATES PATENT AND TRADEMARK OFFICE
CERTIFICATE OF CORRECTION

PATENT NO. : 7,620,794 B2 Page 1 of 1
APPLICATION NO. : 11/594823
DATED : November 17, 2009
INVENTOR(S) : Sakaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 349 days.

Signed and Sealed this

Twenty-sixth Day of October, 2010

David J. Kappos
*Director of the United States Patent and Trademark Office*